US012733582B2

(12) United States Patent
Nayak et al.

(10) Patent No.: US 12,733,582 B2
(45) Date of Patent: Sep. 15, 2026

(54) SYSTEMS AND METHODS FOR CONTROLLING AGRICULTURAL HARVESTING HEADER HEIGHT

(71) Applicant: DEERE & COMPANY, Moline, IL (US)

(72) Inventors: Manish Nayak, Jharsuguda (IN); Vishwanath V. Patil, Pune (IN)

(73) Assignee: Deere & Company, Moline, IL (US)

( * ) Notice: Subject to any disclaimer, the term of this patent is extended or adjusted under 35 U.S.C. 154(b) by 216 days.

(21) Appl. No.: 18/496,312

(22) Filed: Oct. 27, 2023

(65) Prior Publication Data

US 2025/0133989 A1 May 1, 2025

(51) Int. Cl.
*A01D 41/14* (2006.01)

(52) U.S. Cl.
CPC ......... *A01D 41/141* (2013.01); *A01D 41/145* (2013.01)

(58) Field of Classification Search
CPC ........................... A01D 41/141; A01D 41/145
See application file for complete search history.

(56) References Cited

U.S. PATENT DOCUMENTS

| | | | |
|---|---|---|---|
| 6,212,862 B1 | 4/2001 | Staub | |
| 9,510,508 B2 | 12/2016 | Jung | |
| 10,588,258 B2 | 3/2020 | Jung et al. | |
| 11,067,994 B2 | 7/2021 | Borgstadt | |
| 11,193,781 B2 | 12/2021 | Madsen et al. | |
| 2011/0270495 A1 | 11/2011 | Knapp | |
| 2017/0064904 A1 | 3/2017 | Figgins et al. | |
| 2019/0307070 A1 | 10/2019 | Dima et al. | |
| 2019/0335661 A1* | 11/2019 | Seiders, Jr. | A01D 41/141 |
| 2020/0077584 A1* | 3/2020 | Miller | A01D 41/145 |
| 2021/0029877 A1* | 2/2021 | Vandike | A01D 69/00 |
| 2021/0352847 A1 | 11/2021 | Hunt et al. | |
| 2022/0015291 A1 | 1/2022 | Aesaert et al. | |
| 2022/0061218 A1* | 3/2022 | Karst | A01B 63/10 |
| 2022/0225569 A1 | 7/2022 | Zielke et al. | |
| 2022/0232763 A1* | 7/2022 | Palla | G05D 1/0278 |

FOREIGN PATENT DOCUMENTS

| | | |
|---|---|---|
| CN | 112616445 A | 4/2021 |
| CN | 114303587 A | 4/2022 |
| CN | 114793602 A | 7/2022 |
| EP | 2592919 B1 | 9/2015 |
| EP | 3662730 B1 | 9/2022 |

* cited by examiner

*Primary Examiner* — Wade Miles
*Assistant Examiner* — Jaewook Jung
(74) *Attorney, Agent, or Firm* — Taft Stettinius & Hollister LLP; Stephen F. Rost

(57) ABSTRACT

A system that provides proactive control of header height, or an associated fluid pressure for a fluid used in positioning of the height of the header. The system can to maintain a generally constant header height as an agricultural vehicle performs an operation along a field. The system can use a model of either or both mechanical or hydraulic systems of the header. The model can receive information from a terrain map, as well as information that is outputted from header sensors. A predicted output generated by the model can be compared to desired header height settings to derive an error computation. An optimizer can use the error computation, a cost function, and constraints to derive a predicted input. The predicted input can both be communicated to the model as a feedback signal and include one or more control signals for an operation of one or more actuators of the header.

20 Claims, 4 Drawing Sheets

SYSTEMS AND METHODS FOR CONTROLLING AGRICULTURAL HARVESTING HEADER HEIGHT

FIELD OF THE DISCLOSURE

The present disclosure generally relates to controlling a height of a header of an agricultural vehicle, and, more specifically, to controlling a header height using terrain map based model predictive control.

BACKGROUND

Agricultural harvesting vehicles, including, for example, harvesters and combines, can include an agricultural harvesting head that can also be referred to as header. Traditionally, the header separates crop from the ground, and carries the separated crop rearward through an opening in the header. The crop can then be delivered to other portions of the agricultural harvesting vehicle, wherein the crop can be subjected to further processing, such as, for example, threshing, separation, and cleaning operations.

With at least certain types of crops, the effectiveness or efficiency in the operation of the header can be impacted by the distance between the header and the ground. Moreover, with respect to such crops, the effectiveness in terms of crop collected by the header can be improved by having the header placed in generally close proximity to the ground. However, the terrain of the ground surface can vary. Moreover, at least certain portions of ground across a field containing crop can include holes protrusions, variances in slope, or certain obstacles, including, but not limited to rocks, as well as various combinations thereof, among other variances in the terrain of the ground. Thus, while having the distance between the header and the ground, also referred to as header height, being generally low can, for at least some harvesting operations, be beneficial with respect to the effectiveness of the header collecting certain types of crop, a low header height can also present potential hazards in terms of the header running into the group or colliding with various obstacles.

SUMMARY

The present disclosure may comprise one or more of the following features and combinations thereof.

According to certain embodiments, a system is provided for adjusting a height of a header of an agricultural vehicle. The system can comprise at least one sensor that can be configured to provide a sensor output indicative of at least one of an actual header height of the header and an actual fluid pressure of a fluid used at least in the adjustment of the actual height of the header. The system can further include a communication unit that is adapted to receive a terrain map, and at least one actuator that is configured to adjust the height of the header. The system can also include a memory device that is coupled to at least one processor. The memory device can include instructions that when executed by the at least one processor cause the at least one processor to identify, from the terrain map, one or more variations in a terrain of a field, and generate, using a header model and based at least in part on the one or more variations and the sensor output, a predicted output. The predicted output can comprise at least one of (1) a predicted header height to attain a preselected header height, or (2) a predicted fluid pressure to attain a preselected fluid pressure for the header when the header or agricultural vehicle will be at a location in the field that corresponds to the one or more variations in the terrain. The memory device can further include instructions that when executed by the at least one processor cause the at least one processor to determine an error computation based on a difference between at least one of (1) the predicted header height and the preselected header height, and (2) the predicted fluid pressure and the preselected fluid pressure. Additionally, the memory device can include instructions that when executed by the at least one processor cause the at least one processor to generate a predicted input based, at least in part, on the error computation and a cost function, the predicted input comprising at least one of a model header height and a model fluid pressure, and generate, based on the predicted input, one or more control signals for the at least one actuator to the adjust the actual height of the header.

Additionally, according to certain embodiments, a method is provided for adjusting a height of a header of an agricultural vehicle. The method can include identifying, from a terrain map, one or more variations in a terrain of a field, and generating a predicted output using a header model and based at least in part on the one or more variations and a sensor output from one or more sensors indicative of at least one of an actual header height of the header or an actual fluid pressure of a fluid used by a least a cylinder to position the header at the actual height. The predicted output can comprise at least one of (1) a predicted header height to attain a preselected header height, or (2) a predicted fluid pressure to attain a preselected fluid pressure for the header when the header or agricultural vehicle is estimated to be at a location in the field that corresponds to the one or more variations in the terrain. The method can also include determining an error computation based on a difference between at least one of (1) the predicted header height and the preselected header height, and (2) the predicted fluid pressure and the preselected fluid pressure. Further, a predicted input can be generated based, at least in part, on the error computation and a cost function, the predicted input comprising at least one of a model header height and a model fluid pressure. Additionally, based on one or more control signals provided by the predicted input, the actual height of the header can be adjusted.

These and other features of the present disclosure will become more apparent from the following description of the illustrative embodiments.

BRIEF DESCRIPTION OF THE DRAWINGS

The disclosure contained herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

Corresponding reference numerals are used to indicate corresponding parts throughout the several views.

DETAILED DESCRIPTION

Figure 1:
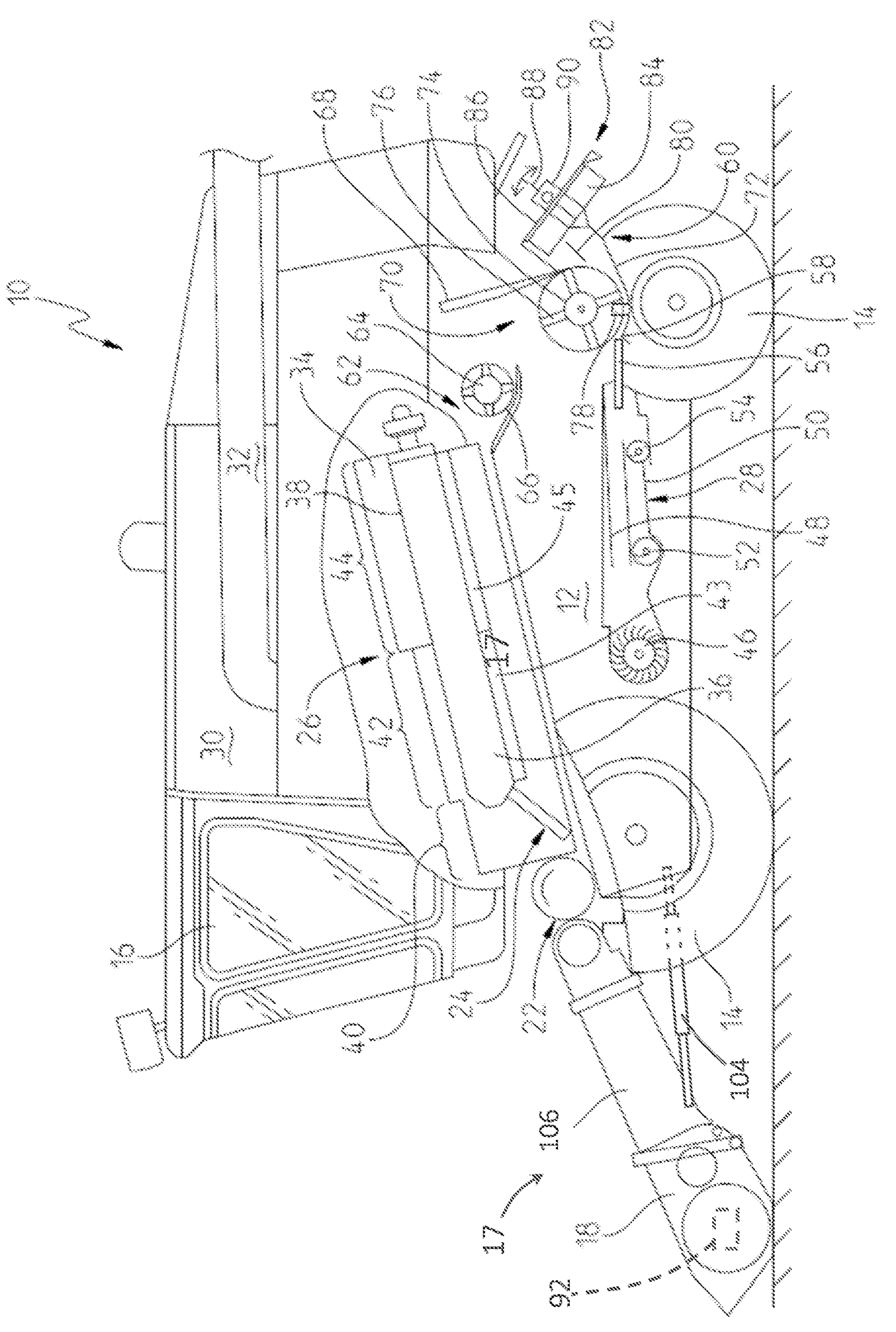
FIG. 1 illustrates a partial cutaway side view of an exemplary agricultural vehicle in the form of a harvester.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

FIG. 1 illustrates a partial cutaway side view of an exemplary agricultural vehicle 10 in the form of a harvester. The agricultural vehicle 10 includes a frame 12 and one or more ground engaging mechanisms, such as wheels 14 or tracks, which are in contact with an underlying ground surface. In the illustrative embodiment, the wheels 14 are coupled to the frame 12 and are used for propulsion of the agricultural vehicle 10 in a forward operating direction (which is to the left in FIG. 1) and in other directions. In some embodiments, operation of the agricultural vehicle 10 is controlled from an operator cab 16. The operator cab 16 can include any number of controls for controlling the operation of the agricultural vehicle 10, such as a user interface. In some embodiments, operation of the agricultural vehicle 10 can be conducted by a human operator in the operator cab 16, a remote human operator, or an automated system. Thus, according to certain embodiments, the agricultural vehicle 10 can be an autonomous or semi-autonomous vehicle. Moreover, according to certain embodiments, the agricultural vehicle 10 can be, or be operated, as an unmanned vehicle. Thus, according to certain embodiments, the agricultural vehicle 10 may not include an operator cab 16.

As mentioned above, the exemplary illustrated agricultural vehicle 10 is a harvester. With such an embodiment, the agricultural vehicle 10 can comprise a plurality of components, or subsystems, relating to the agricultural vehicle 10 performing an agricultural operation at least in the form of harvesting crop material. However, other types of agricultural vehicles can be configured to perform other types of agricultural operations, and thus be configured, including having components or subsystems, for the particular agricultural operation(s) that is/are to be performed by those other agricultural vehicles. For example, in other embodiments in which the agricultural vehicle 10 is a windrower, the agricultural vehicle 10 can be configured to perform agricultural operations at least relating to the formation of windrows.

With respect to the exemplary agricultural vehicle 10 depicted in FIG. 1, the agricultural vehicle 10 can include a header 17 having a cutting head 18 is disposed at a forward end of the agricultural vehicle 10 and is used to harvest crop material and to conduct the harvested crop material to a slope conveyor 20 of the header 17. The slope conveyor 20 conducts the harvested crop material to a guide drum 22. The guide drum 22 of the agricultural vehicle 10 guides the harvested crop material to an inlet 24 of a threshing assembly 26, as shown in FIG. 1. The threshing assembly 26 of the agricultural vehicle 10 can include a housing 34 and one or more threshing rotors. For example, with respect to the exemplary agricultural vehicle 10 depicted in FIG. 1, a single threshing rotor 36 is shown, and the threshing rotor 36 is also illustrated as including a drum 38. The threshing assembly 26 can also include a charging section 40, a threshing section 42, and a separating section 44. The charging section 40 can be arranged at a front end of the threshing assembly 26, the separating section 44 can be arranged at a rear end of the threshing assembly 26, and the threshing section 42 can be arranged between the charging section 40 and the separating section 44.

Harvested crop material, such as, for example, grain, including corn, and material other than grain (MOG) can fall through a thresher basket 43 positioned in the threshing section 42, and through a separating grate 45 positioned in the separating section 44. The harvested crop material can be directed to a clean crop routing assembly 28 with a blower 46 and sieves 48, 50 with louvers. The sieves 48, 50 can be oscillated in a fore-and-aft direction. The clean crop routing assembly 28 of the agricultural vehicle 10 removes the MOG and guides grain over a screw conveyor 52 to an elevator for grain. The elevator for grain deposits the grain in a grain tank 30 of the agricultural vehicle 10, as shown in FIG. 1. The grain in the grain tank 30 can be unloaded by means of an unloading screw conveyor 32 to a grain wagon, trailer, or truck, for example.

Harvested crop material remaining at an end of the sieve 50 can again be transported to the threshing assembly 26 by a screw conveyor 54 where the crop material can be reprocessed by the threshing assembly 26. The harvested crop material delivered at an end of the sieve 48 can be conveyed by an oscillating sheet conveyor 56 to a lower inlet 58 of a crop debris routing assembly 60. The harvested crop material at the threshing assembly 26 is processed by the separating section 44 resulting in straw being separated from other material of the harvested crop material. The straw is ejected through an outlet 62 of the threshing assembly 26 and conducted to an ejection drum 64. The ejection drum 64 interacts with a sheet 66 arranged underneath the ejection drum 64 to move the straw rearwardly. A wall 68 is located to the rear of the ejection drum 64 and guides the straw into an upper inlet 70 of the crop debris routing assembly 60.

The crop debris routing assembly 60 of the agricultural vehicle 10 includes a chopper assembly 71 having a chopper housing 72 and a chopper rotor 74 arranged in the chopper housing 72 that rotates, for example, in a counter-clockwise direction about an axis that extends, for example, perpendicular to the forward operating direction. The chopper rotor 74 includes a plurality of chopper knives 76 that are distributed around a circumference of the chopper rotor 74. The chopper knives 76 interact with opposing knives 78, which are, for example, coupled to the chopper housing 72. The chopper knives 76 and the opposing knives 78 cooperate to chop the straw into smaller pieces.

The illustrated agricultural vehicle 10 also includes one or more spreaders downstream of an outlet 80 of the crop debris routing assembly 60. One spreader 82 is shown in FIG. 1. The spreader 82 may include a number of impeller blades 84, each of which is connected to a disk 86 that rotates about a central axis 88. The impeller blades 84 extend downwardly from the disk 86 and, for example, radially outwardly from the central axis 88. The disk 86 and the impeller blades 84 coupled thereto are rotatably driven by a hydraulic motor 90. Chopped straw is moved through the outlet 80 of the crop debris routing assembly 60 to the spreader 82. Rotation of the impeller blades 84 of the spreader 82 spreads the chopped straw as it exits the agricultural vehicle 10.

Figure 2:
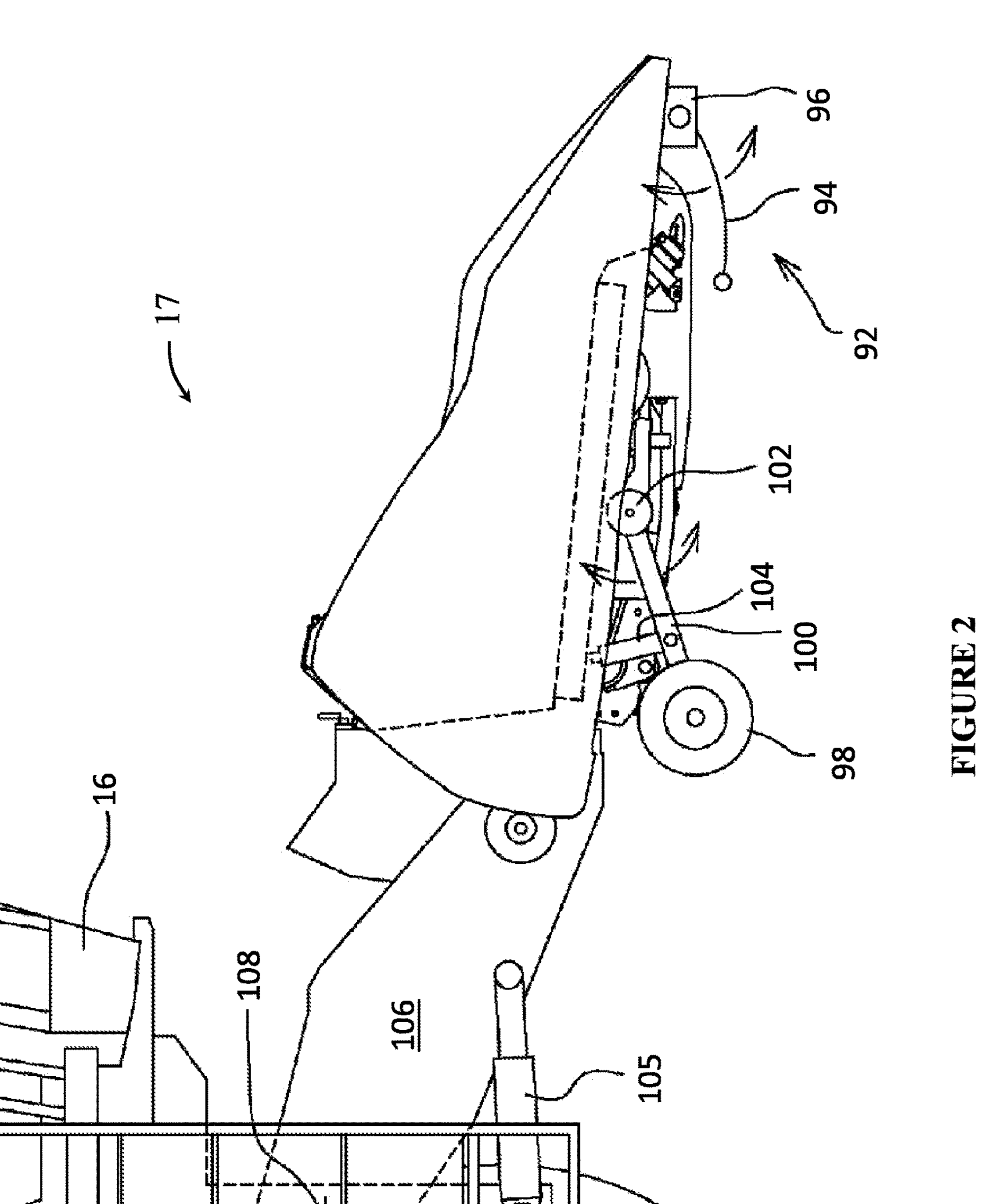
FIG. 2 illustrate a first, or right, side view of an exemplary header for the agricultural vehicle shown in FIG. 1.

FIG. 2 illustrates a first, or right, side of the header 17, including various components that can be generally located at the right side of the header 17. The header 17 can also include a second, or left, side of the header 17 that is generally identical to, and, moreover, a mirror image of the side view shown in FIG. 2. Thus, while certain features described below may be illustrated with respect to the first, or right, side, of the header 17, similar features can also be applicable to the second, or left, side of the header 17.

Referencing FIGS. 1 and 2, one or more height sensors 92, such as, for example, a potentiometer, can be disposed at each opposing lateral ends of the header 17. According to certain embodiments, the height sensors 92 can include a sensor arm 94 having a front end that rests upon the adjacent ground, and a rear end that is coupled to a sensor element 94 of the sensor 92. According to such an embodiment, as the header 17 travels through the field, and the header 17 is raised or lowered with respect to the ground, the sensor arms 94 can pivot upwardly and downwardly at their rear ends, thereby rotating a sensor element 96 of the height sensor 92. The sensor element 96 can be configured to generate a signal that changes in response to the rotation of the senor element 96 in a manner that is indicative of the changing height of the header 17 relative to the ground.

The header 17 can further include, or otherwise be coupled to, a plurality of gauge wheels 98 that can, for example, be disposed on opposing ends of the header 17, as well as positions therebetween. The gauge wheels 98 can be configured to assist in supporting the header 17 as the header 17 travels with the agricultural vehicle 10 over the field, and can be supported for rotation on pivoting float arms 100. The float arms 100 can be pivotally coupled to a frame of the header 17. Additionally, according to certain embodiments, a height sensor 102 can sense the pivoting of the float arms 100 with respect to the frame of the header 17. Thus, as the header 17 raises and lowers while the agricultural vehicle 10 travels over the ground, the gauge wheels 98 can remain in contact with the ground. The float arms 100 can accordingly pivot up and down to maintain the gauge wheels 98 in contact with the ground. Such pivoting can cause the height sensor 102 on each float arm 100 to generate a changing signal that can provide, or be used to determine, the height of the header 17 above the ground.

Support cylinders 104 can also be coupled between the frame of the header 17 and the pivoting float arms 100. The support cylinders 104, which can be hydraulic cylinders, can be positioned and configured to apply a downward pressure on the pivoting float arms 100, and thereby at least partially support the weight of the header 17 on the gauge wheels 98. Moreover, the support cylinders 104 can function at least as a spring support at each of the gauge wheels 98 to at least partially support the weight of the header 17 in some modes of operation.

The header 17 can also include header support cylinders 105, such as, for example, hydraulic cylinders, that are disposed between the frame 12 of the agricultural vehicle 10 and feeder house 106 to support the forward end of feeder house 106. The rear end of feeder house 106 is pivotally coupled to the frame 12 of the agricultural vehicle 10. Further, the header support cylinders 105 can be hydraulic cylinders that can increase and decrease in length (e.g., extend and retract) so that the front end of the feeder house 106 can pivot up and down about the pivotal axis 108 defined by the pivotal connection of the feeder house 106 to the frame 12 of the agricultural vehicle 10. Since the weight of the header 17 can be supported on the feeder house 106, and since the feeder house 106 can be supported by the header support cylinders 105, the pressure of the hydraulic fluid in header support cylinders 105 can be indicative of the weight of the header 17. If the header 17 is lowered slowly, gradually transferring its weight to the ground (by releasing hydraulic fluid from header support cylinders 105) the pressure in the header support cylinders 105 will gradually drop to zero as the entire weight of the header 17 ultimately rests upon the ground.

According to certain embodiments, a load sensor 118, such as, for example, a pressure sensor, can be fluidly coupled to the hydraulic circuit that is utilized to extend and retract the header support cylinders 105. According to embodiments in which the load sensor 118 is a pressure sensor, the load sensor 118 can generate a signal indicative of the pressure in header support cylinders 105. The signal generated by the pressure sensor 118 can also be indicative of the weight of the header 17 that is supported upon the feeder house 106. Additionally, or alternatively, the load sensor 118 can be, or include, a strain gauge that can be coupled to a load-bearing element of the agricultural vehicle 10, including either or both the feeder house 106 and the header 17 that similarly indicates the load of the header 17 upon the feeder house 106.

A first mode for controlling the height of the header 17, which can be referred to as a header height mode, can utilize information provided by one or more of the height sensors 92, 102 to control the height of the header relative to the ground. For example, the height mode can be utilized to at least attempt to cut crop material, via operation of the header 17, at a particular, or selected, length. Thus, the height of the header 17 can be automatically selected, manually set by an operator of the agricultural vehicle 10, or based on a selected length of cut for the crop material. The header support cylinders 105, among other components of the agricultural machine 10, can therefore be extended or retracted in manner that can displace the header 17 relative to the ground so as to attain the selected header height.

As the agricultural machine 10 travels along the field, changes in the characteristics of the field change, including, for example, changes in elevation of the ground, can be detected at least from information provided by one or more of the height sensors 92, 102. Moreover, changes in the actual height of the header 17, as provided by information from the height sensors 92, 102, can provide an indication of a change in the elevation of the adjacent ground. Further, in such situations, information provided from the height sensors 92, 102 can be evaluated, such as, for example, by a controller 110 (FIG. 3) of the agricultural vehicle 10, including in connection with determining differences, if any, between the actual header height and the selected header height. In response to such an evaluation, the controller 110 can, if an adjustment in the actual height of the header 17 is needed, generate one or more commands to activate an actuator(s) 120 (FIG. 3), such as, for example, the header support cylinders 105, in a manner that either raises or lowers the header 17 so that the actual header height satisfies the selected header height.

Additionally, or alternatively, according to certain type of agricultural vehicles 10, a second mode, referred to as a float mode, can be used for controlling the height of the header 17. The float mode involves a generally fixed or constant fluid pressure being maintained in the header support cylinders 105. Moreover, in the float mode, as the agricultural machine 10 travels along the field, a constant downforce is applied by the header 17 to the ground via the generally constant or fixed fluid pressure in the header support cylinders 105. According to certain embodiments, the fluid pressure to be maintained within the header support cylinders 105 can be fixed or otherwise selected by an operator of the agricultural vehicle 10. For example, the fixed or selected fluid pressure that is to be maintained can be based on a percentage of weight of the header 17 that is to be supported by the header support cylinders 105 or the ground, or a selected fluid pressure that is to be maintained in the at least the portion of the fluid circuit associated with the header support cylinders 105.

With the float mode, as the agricultural vehicle 10 travels along the field, the ground beneath the header 17 raises and lowers, which may necessitate the header support cylinders 105 being either extended or retracted in a manner that can generally maintain a constant fluid pressure within the header support cylinders 105 or associated fluid circuit. Accordingly, information provided by the load sensor 118 regarding the actual fluid pressure within the header support cylinders 105 or associated fluid circuit can reflect at least changes in the elevation of the ground beneath the header 17. Thus, such information from the load sensor 118 can be utilized by the controller 110 of the agricultural vehicle 10 to determine whether to operate components of the fluid circuit associated with the header support cylinders 105 so that the actual fluid pressure within the header support cylinders 105 or associated fluid circuit satisfies the fixed or selected fluid pressure. For example, during operation in the float mode, information provided to the controller 110 via at least the load sensor 118 can provide an indication to the controller 110 of whether the controller 110 is to generate one or more signals to facilitate operation of a pump, among other actuators 102, that supplies hydraulic fluid to the header support cylinders 105, or energizing an on/off valve that is fluidly coupled to a 110 control valve of the associated fluid circuit.

With both the header height mode and the float mode, the control of the header height can be reactionary. Moreover, with both modes, adjustments to the header height is made in response to information from the associated sensors 92, 102, 118 that indicates the header height has, at least temporarily, deviated from the selected header height, or that the detected fluid pressure does not satisfy, or is different than, the fixed fluid pressure. In such situations, there can be some delay relating to inherent system latencies between the time of receipt of such feedback sensor information from the sensors 92, 102, 118 and the timing of determination of the corrective action, and implementation of that corrective action. Such delays in adjusting header height can be detrimental to the agricultural operation being performed using the header 17. For example, such delays can be detrimental with respect to the length at which the crop material is actually being cutting while the actual header height deviates from the selected header height, or with respect to avoiding a collision between the header 17 and the ground or other obstacles while the traveling agricultural vehicle 10 is along the field. Accordingly, embodiments discussed herein can provide predictive control for header height based at least on changes in upcoming ground profiles, including elevations, slopes, recesses, and protrusions, and the current state of the agricultural vehicle 10. Such predictive control can improve a responsiveness in terms of proactive adjustments in header height to maintain a generally constant header height as the agricultural vehicle 10 performs an agricultural operation while traveling along a field.

Figure 3:
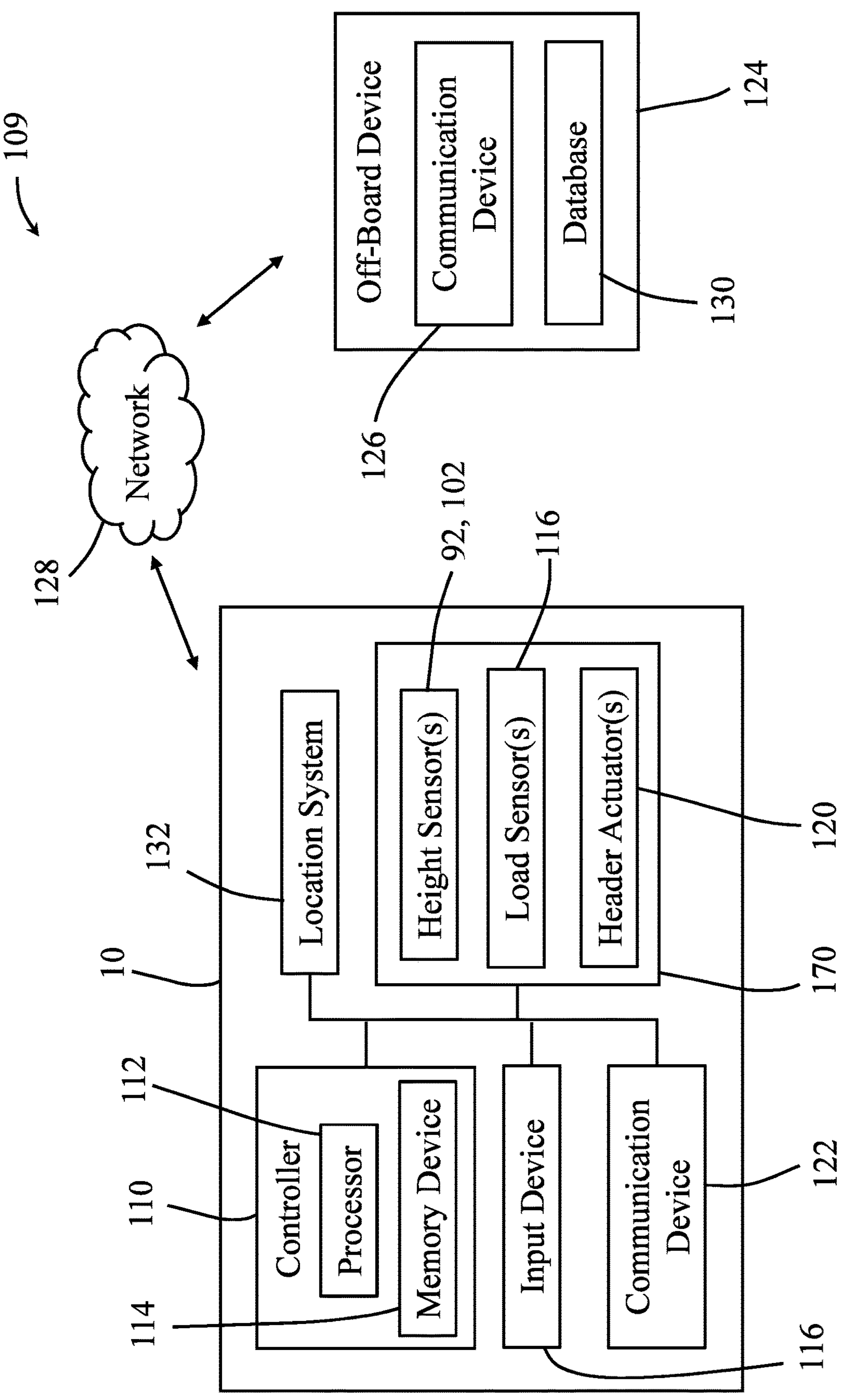
FIG. 3 illustrates a block diagram of an exemplary predictive header height control system.

FIG. 3 illustrates a simplified block diagram of an exemplary predictive header height control system 109. The system 109 can include a model predictive controller 110, also generally referred to herein as controller 110, that can include one or more processors 112 that can follow instructions, including control instructions, contained on one or more memory devices 114, including, for example, a non-transitory machine-readable medium. The controller 110 can be utilized for one or more particular functions, or a plurality of different functions, relating to the operation of the agricultural vehicle 10. For example, according to an illustrated embodiment, the controller 110 is a model predictive controller that can output signals used to proactively adjust the header height of the header 17 based, at least in part, on information derived from a terrain map, a position of the agricultural machine 10 relative to characteristics identified from the terrain map, a current header height or the corresponding fluid pressure of the supply cylinder 105 or associated fluid circuit, among other information. Moreover, the model predictive controller 110 can be configured for the implementation of model based, and predictive regulated, control of header height.

The predictive header height control system 109 can also include either, or both, at least one height sensor 92, 102 or a load sensor 118 that can be communicatively coupled to at least the controller 110. As previously discussed, according to certain embodiments, at least some of the height sensors 92 can output sensor information to the controller 110 that indicates, or can be used by the controller 110 to derive, the height of the header 17 at opposite ends of the header 17. Additionally, or alternatively, at least some height sensors 102 can indicate, or be used by the controller 110 to derive, the height of the header 17 at the gauge wheels 98. The controller 110 can also receive information from the load sensor 118, including, for example, information from a pressure sensor(s) that indicates, or is used to determine, a pressure in one or more header support cylinders 105 or at least a portion of a fluid circuit that is hydraulically coupled to the header support cylinders 105, as previously discussed.

The predictive header height control system 109 can also include one or more header actuators 120 of the header 17 that can, in response to at least a signal generated by the controller 110, be utilized to adjust either or both a position and an angular orientation, including tilt, of the header 17. For example, according to certain embodiments, the controller 17 can be communicatively coupled to a header actuator 120 in the form of one or more of a pump, control valve, or pressure relief valve (collectively referred to herein a "header actuators" 120), as well as combinations therefor, among other components, that can be utilized to control a pressure of a hydraulic fluid in the fluid circuit that includes the header support cylinders 105. Additionally, or alternatively, the header actuator(s) 120 can comprise other types of actuators, including, but not limited to, electric motors, among other types of actuators.

The controller 110 can also be commutatively coupled to one or more operator input devices 116, including, but not limited to, operator input devices 116 that may be located within the operator cab 16, or are remote from the agricultural machine 10. Examples of operator input devices 116 include, but are not limited to, a keyboard, keypad, mouse, touch screen, or joystick, as well as combinations thereof, among other operator input devices 116.

The predictive header height control system 109 can further include a communications device 122 of the agricultural vehicle 10 that can communicate information from, as well as receive information to, the system 109 and other agricultural machines, devices, and databases (collectively referred to herein as off-board device 124). The communications device 122 can be embodied as hardware, firmware, software, virtualized hardware, emulated architecture, and/or a combination thereof. According to certain embodiments, the communications device 122 can comprise a transceiver that is configured to wirelessly communicate information, as well as receive information, that may pertain to, or assist, the system 109, in determining or identifying terrain features for the ground upon which the agricultural vehicle 10 is, or will be, traveling.

The communication device 122 can, according to certain embodiments, exchange communications with a communication device 126 of one or more off-board devices 124, such as, for example, via a network 128, including, for example, via internet, cellular, or Wi-Fi networks, as well as combinations thereof. The off-board device 124, which, according to certain embodiments, can be a cloud based database, can store field data, including, but not limited to, a terrain map(s) or identification of crop material, as well as combinations thereof, among other information, relating to the field, or an associated area, on which the agricultural vehicle 10 is, or will be, performing an agricultural operation. The terrain map can include, among other information, pre-recorded terrain characteristics, including the locations, such as, for example, GPS coordinates of the terrain characteristics. Such terrain characteristics can include terrain topology information, including elevations or changes in elevation and the locations thereof, such as, for, example, the locations of protrusions, recesses, and slopes, among other information or variances in the field that can impact at least the height of the header 17. The terrain characteristics can also include locations of crop materials and detected obstacles, including obstacles that may be above, at least partially obscured beneath, or concealed below the ground, as well as combinations thereof, among other terrain characteristics. According to certain embodiments, the field data, including the terrain map, can be generated by a mapping system of an agricultural vehicle during a prior performance of an agricultural operation. Such generated field data can be communicated to, and stored by, a database 130, including a memory unit of the off-board device 124, as well as stored by a memory device of the agricultural vehicle that generated that field data. Additionally, the field data can be updated, or replaced, by field data subsequently generated during the performance of other agricultural operations.

The predictive header height control system 109 can further include a location system 132, such as, for example, a global positioning system (GPS), that is capable of providing a location of the agricultural vehicle 10. With the aid of the location system 132, and with access to, including, retrieval, of the field data from either the off-board device 124 or the memory device 114, the controller 110 is configured to identify a location of the agricultural vehicle 10 relative to pre-identified terrain characteristics. Further, according to certain embodiments, the location system 10 can be configured to identify, using, for example GPS information and information regarding the configuration or sizing the agricultural vehicle 10, a location of certain particular components of the agricultural vehicle 10, such as the header 17, relative to the terrain characteristics identified from the field data. As discussed below, awareness of the location of the agricultural vehicle 10, such as the header 17, relative to a terrain characteristic, such as, for example, a recess, protrusion, or obstacle, among other terrain characteristics, can be proactively utilized by the controller 110 to generate signals to facilitate an adjustment in the header height, if necessary, so as to at least assist in satisfying the preselected header height, or otherwise maintain a generally consistent header height or fluid pressure for the support cylinder 105 or associated fluid circuit.

Figure 4:
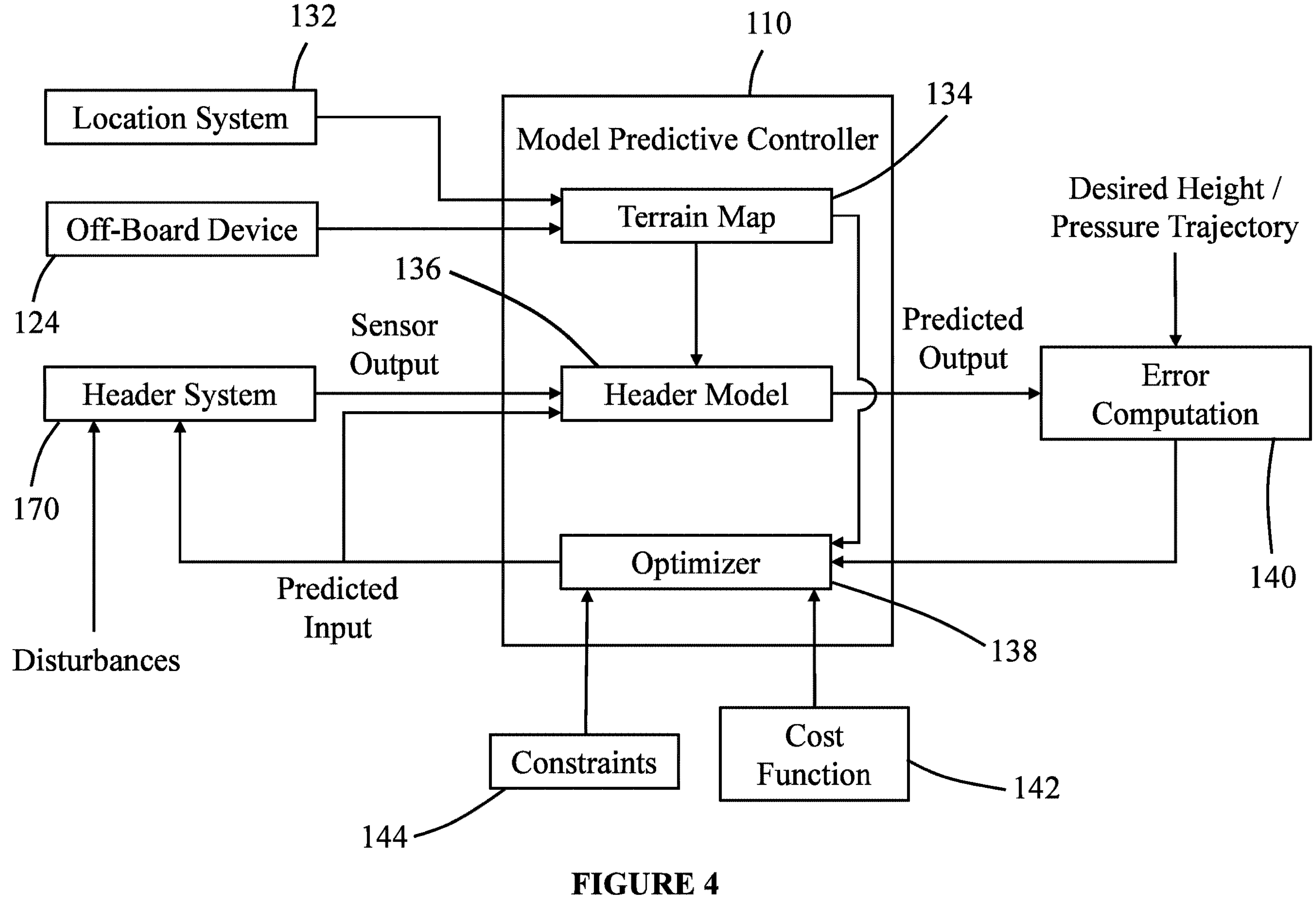
FIG. 4 illustrates an exemplary model for predictive control of a header height.

FIG. 4 illustrates an exemplary model for predictive control of a header height. As shown, the model predictive controller 110 can receive field data, such as, for example, a terrain map 134, from the memory device 114 of the agricultural vehicle 10 or the database 130 of the off-board device 124. Thus, as previously discussed, the terrain map 134 can provide the controller 110 with at least topography information, including, for example, the elevation, and changes in elevation, of the ground at various locations about the field. The controller 110 can also receive information from the location system 132 relating to the current location of the agricultural vehicle 10, or portions thereof, such as, for example, the location of the header 17. The controller 110 can also receive, or derive, a variety of other information relating to a current state of the agricultural vehicle 10, including, but not limited to, information relating to the travel or movement of the agricultural vehicle 10, such as, for example, a direction of travel, speed of travel, or acceleration/deceleration of the agricultural vehicle 10, as well as combinations thereof, among other information. Such travel or movement information, in addition to the location information provided by the location system 132 and information provided by the terrain map 134, can be used by the controller 110 to, throughout the performance of an agricultural operation about a field, determine including estimate or predict, when the agricultural vehicle 10 may reach a location at which the elevation of the ground changes to an extent that can warrant an adjustment in the header height or associated fluid pressure used to control header height.

As seen in FIG. 4, the model predictive controller 110 can further include a header model 136, which can be a control-oriented model that characterizes the dynamics of the header 17, and, more specifically, hydraulic and mechanical dynamics of the header 17, as well as the associated systems that control the positioning of the header 17. Thus, according to certain embodiments, the header model 136 is a hydro/mechanical dynamic model that consists of both hydraulic and mechanical dynamics of the system of the agricultural vehicle 10 used to control, and maintain, the positioning of the header 17, including the header height. The modelling of the hydraulic dynamics for the header model 136 can consist of one or more, if not all, of the pumps, motors, valves, orifices and other hydraulic components in one or more fluid circuits that interact together. For example, the header model 17 can characterize hydraulic dynamics of the header 17, or associated systems of the agricultural vehicle 10, relating to the actuators 120, pumps, pressure relieve valves, control valves, or header support cylinders 104, 105, as well as various combinations thereof, among other components of one or more hydraulic fluid circuits utilized in the operation of the header 17. Further, the hydraulic model can be configured to model internal states of the hydraulic system (s) utilized in the operation of the header 17, such as, for example, fluid pressure and fluid flow rate, among other properties or characteristics associated with the hydraulic dynamics of the header 17 or associated hydraulic systems. Additionally, the header model 17 can characterize the mechanical dynamics of the header 17, including, for example, model different structural aspects of the header 17 or associated mechanical systems, including, for example, the weight of the header 17, piston stroke and stiffness, and external loads, among other aspects relating to, or that can impact, the mechanical dynamics of the header 17. Further, the header model 136 also can simulate the interaction between the hydraulic dynamics and the mechanical dynamics, or associated hydro/mechanical systems. According to certain embodiments, both the hydraulic dynamics and the mechanical dynamics can be modeled via the header model 136 so as to characterize the header 17, or associated system(s), in a manner in which the information generated by the header model 136 regarding the hydro/mechanical systems can attain a desired level of accuracy without utilizing other system information.

The header model 136 can utilize datasheets and estimated parameters from measurements received by the header model 136, including from one or more sensors 92, 102, 118, among other sensed or measured information. Such datasheets and estimated parameters can be utilized in at least an attempt for the header model 136 to generally mimic, or be similar to, the actual hydro/mechanical systems of the agricultural vehicle 10 that are utilized to control, as well as adjust, the height of the header 17. Further, the header model 136 includes one or more parameters obtained from one or more datasheets or one or more lookup tables. For example, according to certain embodiments in which the header actuator 120 is, or includes, a pump, the header model 136 can use information provided by datasheets regarding the efficiency, or changes in the efficiency, of the pump for different operating speeds, such as, for example, revolutions per minute (rpm). Incorporation of such actual information pertaining to the operation of the pump can be utilized to improve the accuracy of the header model 136 in modelling or representing one or more of the actual hydro/mechanical systems used to position the header 17.

The header model 136 can receive the terrain map 134, such as, for example, from the off-board device 124, and information regarding the location of the agricultural vehicle 10, or portion thereof, including the header 17, as may be indicted by the location system 112, so as to have information that can indicate current, and upcoming terrain characteristics. Moreover, such terrain information and information regarding the location of the header 10 or agricultural vehicle 10 indicate whether the header 10 or agricultural vehicle 10 is at, or approaching, an area of the field where the terrain changes in a manner that may necessitate a change in header height, or associated fluid pressure for the support cylinder(s) 105, to maintain the header 17 at, or around, the preselected header height or preselected fluid pressure.

Additionally, the header model 136 can also receive information outputted by either or both the load sensor 118 or one or more of the height sensors 92, 102 (generally referred to herein, and in FIG. 4, as "sensor output"). The sensor output can provide the header model 136 with information indicating, or be used to derive, the actual header height of the header 17. Further, as also indicated in FIG. 4, the information provided by the sensor output to the header model 136 can also indicate disturbances that the header 17 may be experiencing. Such disturbances can include external impacts on, or otherwise experienced by, the header 17, including, but not limited to, header oscillation due to sudden strong wind gust, collision of the header 17 with an obstacle(s), such as, for example, a previously unidentified rock, and changes in hydraulic behavior associated with, for example, hydraulic leaks or temperature variation, among other external impacts.

The header model 136 can also receive information from a predicted control signal (generally referred to herein, and in FIG. 4, as "predicted input") from an optimizer 138 of the model predictive controller 110 that can indicate that, based on a current change, as well as further upcoming changes, in terrain characteristics, the extent the height of the header 17, or associated fluid pressure, is to be adjusted, as discussed below.

The actual header height information provided by the sensor output, and the predictive control information provided by the predicted input generated by the optimizer 138, can indicate the extent of a change(s), if any, to be made in the operation of the header actuator 120. Additionally, or alternatively, based on the predicted input provided by the optimizer 138, the header model 136 can anticipate, or predict, a corresponding value(s) that the header 136 is to receive from the information provided by sensor output from the sensors 92, 102, 118, or vice versa. Thus, the header model 136 can evaluate, including compare, the received sensor output with the corresponding values provided by the predicted input generated by the optimizer 138 to determine the presence of a deviation between actual header height (as indicated the sensor output) and predicted height (corresponding to information from the predicted input generated by the optimizer 138). To the extent there is such a deviation in the information provided to the header model 136, the header model 136 can adjust the model used by the header model 136, or values for parameters used by the header model 136, so as to adjust the "predicted output" (as seen in FIG. 4) generated by the header model 138. Such a variation may seek to cause a change in the predicted input subsequently generated by the optimizer 138 such that the subsequent predicted input generated by the optimizer 138 is closer to, if not in general conformity, with the associated information provided by, or derived from, the sensor output.

The predicted output generated by, and outputted from, the header model 136 can be a model value. For example, according to certain embodiment, the predicted output can be a model header height or model fluid pressure. Moreover, the predicted output can be a model of the header height or fluid pressure that is to be attained in response to the header 17, or agricultural vehicle 10, approaching a change in terrain characteristics, including, for example, one or more changes in elevation of the ground, as indicated by the terrain map 134. According to certain embodiments, the predicted output can be expressed as a model fluid pressure that is anticipated to be detected by the load sensor 118, or a model header height that is anticipated to be detected, or otherwise determined, using information from a height sensor 92, 102.

The predicted output generated by the header model 136 can be used by the controller 110 in connection with the controller 110 performing an error computation. Moreover, the controller 110 can perform an error computation involving an evaluation, or comparison, of the model value provided by the predicted output from the header model 136 and a corresponding preselected desired value relating to header height, which may, for example, be selected by an operator of the agricultural vehicle 10. The desired height or pressure trajectory can be set by the operator, such as, for example, via use of the operator input device 116 inside the operator cab 16. Thus, the error computation can involve comparing a header height or fluid pressure for positioning the header 17, as provided by the predicted output generated by the header model 136, with a corresponding preselected, or desired, header height or fluid pressure for positioning the header 17. For example, the operator can set the desired pressure trajectory to be 2 bars, as can be detected by the load sensor 118. The header model 136 can output a predicted output indicating, based on a change(s) in an upcoming terrain characteristic(s), as indicated by at least the terrain map 134, an extent the header 17 is to be raised or lowered so as to maintain a desired pressure of 2 bar. However, the model pressure of the predicted output, as generated by the header model, can be compared with the desired pressure trajectory, as set by the operator, by the controller via the error computation 140 to determine if, or the extent, any differences exists between the model pressure of the predicted output and the desired pressure trajectory. To the extent differences do exist, those differences can be communicated to the optimizer 138.

The optimizer 138 comprises an optimization routine that can receive, as an input, the error computation 140, among other information, and utilize a cost function 142 and, optionally, constraints 144 to generate the predicted input that is outputted by the optimizer 138. Thus, the optimizer 138 can utilize information regarding the terrain map 134 and from a header system 170 that includes the header 17, including sensor output, via the predicted output generated, and outputted, by the header model 136. According to certain embodiments, the optimizer 138 can utilize a cost function 142 and information regarding the state of the system in an iterative process to determine a control signal in the form of the predicted input that satisfies one or more constraints 144.

The cost function 142 can be configured to, for example, generate a difference between an actuator control input that can be utilized to control the operation of the header actuator 120 so as to attain the desired height or fluid pressure trajectory for the header 17, and a model actuator control input that would be utilized to attain the model height or fluid pressure trajectory from the predicted output generated by the header model 136. Moreover, the cost function 142 can be configured to minimize a difference between the desired trajectory height or fluid pressure for the header 17, as may be set by the operator, and the model header height or fluid pressure, as provided by the predicted output from the header model 136. For example, according to certain embodiments, the cost function can be the square of the difference outputted from the error computation 140, and, moreover, the square of the difference between the desired height or fluid pressure trajectory and the model header height or fluid pressure from the predicted output generated by the header model 140. Thus, according to certain embodiments, the cost function can be based at least in part on the terrain map 134 and the sensor output from the header system 170, as utilized in the generation of the predicted output utilized for the error computation 140.

The cost function 142 can, via at least the identified difference between the model height trajectory or fluid pressure, as provided by the predicted output, and the actual header height, as indicated by the sensor output. Such a determination by use of the cost function 142 can provide an indication of the accuracy of predicted output being generated by the header model 140, and thus the accuracy of the header model 140. Thus, adapting or adjusting the header model 140 so as to attain a lower value(s) from the cost function 142 can indicate an improvement in the accuracy of the predicted output provided by the header model 140, including an improved accuracy with respect to either or both the predicted header height or predicted fluid pressure provided by the predicted output. For example, by adjusting the header model 136, or adjusting the values of variables, parameters, or settings used by the header model 136, can result in an adjustment in the predicted output generated by the header model 136.

The cost function also can be based, at least in part, on a variety of variables and considerations in addition to, or in lieu of, the difference(s) between the predicted header height or predicted fluid pressure and the actual header height or actual fluid pressure, as indicated by information provided by the sensor output. Additionally, or alternatively, the cost function 142 can also be a function of other, or additional, considerations. For example, according to certain embodiments, in addition to consideration of an outcome of a comparison of predicted and actual values corresponding to header height or fluid pressure, the cost function 142 determination can also include considerations relating to a current state of one or more systems of the agricultural machine 10, including, but not limited to, the header 17. For example, according to certain embodiments, the state of the system can include one or more measured or sensed conditions, including, but not limited to, the weight or mass of the agricultural machine 10 or header 17, the velocity at which the agricultural vehicle 10 or header 17 is traveling, or the pitch, tilt, or roll of the header 17, as well as combinations thereof, among other states or conditions of the system. Thus, the cost function 142 can be configured to, for example, minimize the difference or error between the desired trajectory height for the header 17 and the model height for the header that is provided by the predicted output from the header model 136 as a function of one or more of the conditions or variables.

As previously mentioned, the predicted input generated by the optimizer 138 can also be at least partially based on one or more constraints 144 that can limit the extent certain operations that can be performed in connection with the positioning, including displacement and the height, of the header 17. Further, the constraints 144 can be in a hierarchical arrangement, and moreover, arranged such that certain constraints 144 may have preference over other constraints 144. Thus, for example, certain constraints 144 may be given preference, or be considered a higher level constraint, such that that particular constraint(s) may not be optional, or satisfaction of the constraint(s) may be necessary, regardless if satisfaction of that constraint may cause another, lower level, or less preferential constraint to not be satisfied. For example, certain constraints 144 relating to the comfort of an operator in the operator cab 16 may be given preference over constraints 144 relating to conservation of power utilized in connection with operation of the header actuator 120. Additionally, according to certain embodiments, the constraints 144 can be selected and defined by the operator. Additionally, or alternatively, constraints 144 can be preselected, preset, or predefined without input from the operator.

A variety of different type of constraints 144 can be utilized. For example, according to certain embodiments, certain types of constraints 144 can limit the power that can be delivered to, or used or consumed in connection with the operation of, the header actuator 120. For example, according to embodiments in which the header actuator 120 includes, or is otherwise operated in connection with operation of, a pump or motor, one or more constraints 144 can limited the power that is to be consumed by the operation of the pump or motor in adjusting the header height or associated fluid pressure. For example, a constraint 144 may limit the power utilized by actuator 120 in terms of kilowatts so as to assist in conservation of power, or to assist in preservation of the durability of the actuator 120. Another exemplary constraint 144 can also limit the speed or acceleration at which the header 17 is vertically displaced, including raised or lowered, so as to at least assist in the stability of the operation of the agricultural vehicle 10 or header 17. Other exemplary constraints 144 can relate to operator comfort, such as, for example, limiting the pitch angle of the agricultural vehicle 10 that may result from a change in the header height so as to minimize discomfort, or potential discomfort, of an operator in the operator cab 16. Thus, for example, a constraint 144 can limit, if not prevent, the actuator 120 being operated in an manner that prevents the operator cab 16 from being pitched at, or beyond, a certain tilt angle in either a forward or rearward direction, and thereby so as to minimize discomfort for an operator in the operator cab 16. Thus, the optimizer 138 can evaluate whether a model header height or fluid pressure, as provided by the predicted output generated by the header model 136 would, if implemented, violate one or more constraints 144. With respect to certain embodiments, failure to satisfy constraints 144 may preclude the optimizer 138 generating one or more control signals, via the predicted input, that could result in actual implementation of the model header height or fluid pressure by the header system 170. However, according to other embodiments in which the constraints 144 are part of a hierarchical arrangement and some, but not all, of the constraints 144 are satisfied, whether the model header height or fluid pressure become the basis for one or more control signals for the header system 170 can be at least partially dependent on whether the constraints 144 that are not satisfied are higher level constraints.

Accordingly, using information provided from the error computation 140, the cost function 142, and the constraints, the optimizer 138 can output the predicted input. The predicted input generated by the optimizer 138 can be a model value, such as, for example, a model value(s) that is a prediction of the header height or associated fluid pressure that is to be attained in view of a change in the terrain about which the agricultural vehicle 10 is operating. Further, the model value(s) generated by the optimizer 138 can be the product of an iterative process in which parameters used by one or more models, including algorithms, of the optimizer 138 are varied in a manner that seeks to minimize the result of the cost function 142 while also satisfying at least some of the constraints 144. Additionally, according to certain embodiments, the model value(s) generated by the optimizer 138 may not be limited to terrain characteristics at a particular point or location in the field. Moreover, the predicted input generated by the optimizer 138 can be the product of an iterative process that seeks to provides model values for either or both a header height or associated fluid pressure that will result in the header height or associated fluid pressure being at, or close to, either or both the desired header height or fluid pressure over a period of time, including as the terrain may experience different change in elevation as the agricultural machine 10 travels along the field. For example, the predicted input generated by the optimizer 138 can also include forward looking information, including upcoming changes in the terrain, as indicated by at least either or both the terrain map 134 and output from one or more sensors.

As seen in FIG. 4, the predicted input generated by the optimizer 138 can be both communicated to the header model 136, such as, for example, as a feedback signal, for potential refinement of the predicted output being generated header model 136, and communicated to the header system 170 as one or more control signals. Accordingly, the control signal(s) provided by the predicted input to the header system 170 can be utilized to operate at least the header actuator 120 so as to adjust the header height or associated fluid pressure in a manner that can attain, or corresponds to, either or both the model header height or fluid pressure, as determined by the optimizer 138. Thus, the predicted input information received by the header system 170 can provide a control signal indicating a change(s) in the operation of a header actuator 120 of a fluid circuit associated with the support cylinders 104. Such control signals of the predicted input can be a pressure of the hydraulic fluid for the support cylinders 104, and/or the extension(s)/retractions(s) of/for the support cylinders 104 that, if attained, are predicted to maintain the header height at generally the preselected height in view of upcoming changes in the terrain characteristics, as indicated by at least the terrain map.

The header control system 109 of the subject disclosure is able to provide predictive control of the header height in real, or near real, time that can utilize shared terrain map information, including terrain maps that can be shared by an off-board device 124 with different agricultural vehicles. Moreover, the proactive solution provided by such predictive control of header height, or associated fluid pressure, can at least assist in attaining a generally uniform cut height for crop material in the presence of uneven terrains. Further, the control system 109, including, but not limited to, the utilization of the constraints 144, including operator defined constraints 144, by the optimizer 138 in generation of control signals for implementation by the header system 170 can assist in maintaining operator comfort. For example, the approach disclosed herein can minimize, if not avoid, sudden pitch maneuvers that can adversely impact operator comfort as well as be detrimental to the stability of the agricultural vehicle 10.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

The invention claimed is:

1. A system for adjusting an actual height of a header of an agricultural vehicle, the system comprising:

at least one sensor configured to provide a sensor output indicative of at least one of the actual height of the header and an actual fluid pressure of a fluid used in the adjustment of the actual height of the header;

a communication unit adapted to receive a terrain map;

at least one actuator configured to adjust the actual height of the header;

at least one processor; and a memory device coupled to the at least one processor, the memory device including instructions that when executed by the at least one processor cause the at least one processor to:

identify, from the terrain map, one or more variations in a terrain of a field;

generate, using a header model and based at least in part on the one or more variations in the terrain of the field and the sensor output, a predicted output comprising at least one of (1) a predicted header height, when the sensor output is indicative of the actual height of the header, to attain a preselected header height, and (2) a predicted fluid pressure, when the sensor output is indicative of the fluid pressure of the fluid, to attain a preselected fluid pressure for the header when the header or agricultural vehicle will be at a location in the field that corresponds to the one or more variations in the terrain of the field;

determine an error computation based on a difference between at least one of (1) the predicted header height and the preselected header height, and (2) the predicted fluid pressure and the preselected fluid pressure;

generate a predicted input based, at least in part, on the error computation and a cost function evaluated over a period of time, the predicted input comprising at least one of a model header height and a model fluid pressure, wherein the cost function is subject to a plurality of constraints in a hierarchical arrangement, such that satisfaction of a higher-priority constraint of the plurality of constraints is prioritized regardless of whether such satisfaction causes a lower-priority constraint of the plurality of constraints to not be satisfied; and generate, based on the predicted input and before the header or the agricultural vehicle reaches the identified one or more variations in the terrain, one or more control signals for the at least one actuator to adjust the actual height of the header.

2. The system of claim 1, wherein the cost function is at least a function of a difference between at least one of, when the sensor output is indicative of the actual height of the header and the predicted header height, and, when the sensor output is indicative of the fluid pressure of the fluid, the actual fluid pressure and the predicted fluid pressure.

3. The system of claim 1, wherein the memory device further includes instructions that when executed by the at least one processor cause the at least one processor to proactively generate the one or more control signals for the at least one actuator to adjust the actual height of the header before the header or the agricultural vehicle reaches the location in the field that corresponds to the one or more variations in the terrain.

4. The system of claim 1, wherein the memory device further includes instructions that when executed by the at least one processor cause the at least one processor to communicate at least a portion of the predicted input to the header model as a feedback signal.

5. The system of claim 4, wherein the memory device further includes instructions that when executed by the at least one processor cause the at least one processor to adjust the header model in response to the feedback signal.

6. The system of claim 1, wherein the memory device further includes instructions that when executed by the at least one processor cause the at least one processor to receive a signal indicative of an operator defining at least one constraint of the plurality of constraints.

7. The system of claim 1, wherein the plurality of constraints comprises at least an energy constraint that limits an energy consumption of the at least one actuator and a speed constraint that limits a speed or an acceleration for a displacement of the header.

8. The system of claim 1, wherein the plurality of constraints comprises at least one of an energy constraint that limits an energy consumption of the at least one actuator and a speed constraint that limits a speed or an acceleration for a displacement of the header.

9. The system of claim 1, wherein the header model comprises one or more models of at least one of a mechanical system for when the predicted output is the predicted header height, and a hydraulic system of the header for when the predicted output is the predicted fluid pressure.

10. The system of claim 9, wherein the header model further comprises one or more parameters obtained from one or more datasheets or one or more lookup tables.

11. The system of claim 10, wherein the one or more parameters includes an estimated parameter obtained from one or more measurements taken from the header.

12. A method for adjusting an actual height of a header of an agricultural vehicle, the method comprising:

identifying, from a terrain map, one or more variations in a terrain of a field;

generating, using a header model and based at least in part on the one or more variations in the terrain of the field and a sensor output from one or more sensors indicative of at least one of the actual height of the header or an actual fluid pressure of a fluid used by at least a cylinder to position the header at the actual height, a predicted output comprising at least one of (1) a predicted header height, when the sensor output is indicative of the actual height of the header, to attain a preselected header height, and (2) a predicted fluid pressure to attain a preselected fluid pressure, when the sensor output is indicative of the fluid pressure of the fluid, for the header when the header or agricultural vehicle is estimated to be at a location in the field that corresponds to the one or more variations in the terrain;

determining an error computation based on a difference between at least one of (1) the predicted header height and the preselected header height, and (2) the predicted fluid pressure and the preselected fluid pressure;

generating a predicted input based, at least in part, on the error computation and a cost function evaluated over a period of time, the predicted input comprising at least one of a model header height and a model fluid pressure, wherein the cost function is subject to a plurality of constraints in a hierarchical arrangement, such that satisfaction of a higher-priority constraint of the plurality of constraints is prioritized regardless of whether such satisfaction causes a lower-priority constraint of the plurality of constraints to not be satisfied; and adjusting, based on one or more control signals provided by the predicted input and before the header or the agricultural vehicle reaches the identified one or more variations in the terrain, the actual height of the header.

13. The method of claim 12, further comprising determining an outcome for the cost function, the outcome being at least a function of a difference between at least one of, when the sensor output is indicative of the actual height of the header and the predicted header height, and, when the sensor output is indicative of the fluid pressure of the fluid, the actual fluid pressure and the predicted fluid pressure.

14. The method of claim 12, wherein the plurality of constraints in the hierarchical arrangement comprises at least a first constraint and a second constraint, and wherein the first constraint is a higher-priority constraint that relates to at least one of a comfort of an operator of the agricultural vehicle or a stability of the agricultural vehicle or the header, and the second constraint is a lower-priority constraint that relates to at least one of a power consumption of one or more actuators used to adjust the actual height of the header or a speed or acceleration of a displacement of the header.

15. The method of claim 12, further comprising communicating at least a portion of the predicted input to the header model as a feedback signal.

16. The method of claim 15, further comprising adjusting the header model in response to the feedback signal.

17. The method of claim 16, wherein generating the predicted input further comprises generating the predicted input based, at least in part, on a constraint, and further comprising receiving a signal indicative of an operator defining the constraint.

18. The method of claim 12, further comprising evaluating an outcome for each of the plurality of constraints based on the hierarchical arrangement, wherein the higher-priority constraint relates to at least one of a comfort of an operator of the agricultural vehicle or a stability of the agricultural vehicle or the header, and wherein the lower-priority constraint relates to at least one of a power consumption of one or more actuators configured to adjust the actual height of the header or a speed or acceleration of a displacement of the header.

19. The method of claim 12, wherein generating the predicted output comprises applying one or more models of at least one of a mechanical system for when the predicted output is the predicted header height, and a hydraulic system of the header for when the predicted output is the predicted fluid pressure.

20. The method of claim 19, wherein generating the predicted output comprises applying one or more parameters to the header model, the one or more parameters being obtained from one or more datasheets or one or more lookup tables.

* * * * *